US012669740B2

(12) United States Patent
Kim et al.

(10) Patent No.: US 12,669,740 B2
(45) Date of Patent: Jun. 30, 2026

(54) APERTURE MODULE AND CAMERA MODULE INCLUDING THE SAME

(71) Applicant: SAMSUNG ELECTRO-MECHANICS CO., LTD., Suwon-si (KR)

(72) Inventors: Ju Ho Kim, Suwon-si (KR); Jongeun Park, Suwon-si (KR); Sanghyun Ji, Suwon-si (KR); Dooseub Shin, Suwon-si (KR); Dohwan Kim, Suwon-si (KR); Donghoon Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 173 days.

(21) Appl. No.: 18/110,533

(22) Filed: Feb. 16, 2023

(65) Prior Publication Data

US 2023/0280635 A1 Sep. 7, 2023

(30) Foreign Application Priority Data

| Mar. 3, 2022 | (KR) | ........................ 10-2022-0027441 |
| Sep. 15, 2022 | (KR) | ........................ 10-2022-0116238 |

(51) Int. Cl.
*G03B 9/06* (2021.01)

(52) U.S. Cl.
CPC ..................................... *G03B 9/06* (2013.01)

(58) Field of Classification Search
CPC ..................................................... G03B 9/06
See application file for complete search history.

(56) References Cited

U.S. PATENT DOCUMENTS

| 4,588,276 A | * | 5/1986 | Kaise | ....................... G03B 9/06 |
| | | | | 396/510 |
| 2007/0098399 A1 | | 5/2007 | Yasunaga | |

(Continued)

FOREIGN PATENT DOCUMENTS

| CN | 210894825 U | * | 6/2020 |
| JP | 4994639 B2 | | 8/2012 |

(Continued)

OTHER PUBLICATIONS

Schneider, Jaron. "Huawei Develops Smartphone Camera with a Traditional Variable Aperture". *PetaPixel*. (2021). pp 1-7.

(Continued)

*Primary Examiner* — Stephanie E Bloss
*Assistant Examiner* — Diana Hancock
(74) *Attorney, Agent, or Firm* — NSIP Law

(57) ABSTRACT

An aperture module includes a base plate configured to have a central opening and include a pivot pin protruding from one corner area of the base plate, a pair of first blades configured to pivot about the pivot pin to form a first aperture diameter smaller than a diameter of the central opening, a pair of second blades configured to pivot about the pivot pin to form a second aperture diameter smaller than the first aperture diameter, a cover plate, comprising a cover guide slot, configured to cover the pair of first blades and the pair of second blades positioned on the base plate, and an aperture driver, comprising a driving pin coupled to a blade slot disposed in either one of the pair of first blades or the pair of second blades and the cover guide slot and configured to move along the cover guide slot.

22 Claims, 23 Drawing Sheets

(56)        References Cited

U.S. PATENT DOCUMENTS

| | | | | |
|---|---|---|---|---|
| 2015/0160533 | A1 * | 6/2015 | Yoshizawa | G03B 9/06 |
| | | | | 396/510 |
| 2018/0003915 | A1 | 1/2018 | Shin et al. | |
| 2020/0264495 | A1 * | 8/2020 | Zhuo | G03B 9/06 |
| 2020/0272026 | A1 * | 8/2020 | Wang | G03B 9/06 |
| 2020/0401014 | A1 * | 12/2020 | Seo | G03B 9/06 |
| 2023/0392707 | A1 * | 12/2023 | Wen | F16K 27/003 |

FOREIGN PATENT DOCUMENTS

| | | | | |
|---|---|---|---|---|
| JP | 2020-140206 | A | | 9/2020 |
| KR | 10-2014-0146919 | A | | 12/2014 |
| KR | 20160032070 | A | * | 3/2016 |
| KR | 10-1938273 | B1 | | 1/2019 |
| KR | 10-2020-0101293 | A | | 8/2020 |
| KR | 10-2020-0144259 | A | | 12/2020 |
| KR | 10-2304255 | B1 | | 9/2021 |

OTHER PUBLICATIONS

Korean Office Action issued on Oct. 5, 2024, in counterpart Korean Patent Application No. 10-2022-0116238 (8 pages in English, 7 pages in Korean).
Korean Notice of Allowance issued on May 23, 2025, in corresponding Korean Patent Application No. 10-2022-0116238. (2pages in English, 3pages in Korean).

* cited by examiner

APERTURE MODULE AND CAMERA MODULE INCLUDING THE SAME

CROSS-REFERENCE TO RELATED APPLICATION

This application claims the benefit under 35 USC 119(a) of Korean Patent Application No. 10-2022-0116238, filed in the Korean Intellectual Property Office on Sep. 15, 2022, and Korean Patent Application No. 10-2022-0027441, filed in the Korean Intellectual Property Office on Mar. 3, 2022, the entire disclosures of which are incorporated herein by reference for all purposes.

BACKGROUND

1. Field

The following description relates to an aperture module and a camera module including the same.

2. Description of the Related Art

In recent years, cameras are basically employed in portable electronic devices such as smartphones, tablet PCs, and laptops. As competition for product differentiation in portable electronic devices intensifies, cases of applying functions of general digital cameras to cameras of portable electronic devices are increasing. A demand for obtaining a bokeh effect or a bright and clear picture by controlling an amount of light through variable aperture has also increased.

A general digital camera has a mechanical aperture to be driven to change an amount of light incident dependent on a photographic environment. However, in the case of a camera module applied to a small device such as a portable electronic device, it is difficult to apply such a mechanical aperture due to its structural characteristics and spatial limitations.

A typical mechanical aperture of general digital cameras has drawbacks in that it has a large number of parts and a plurality of rotating blades with a circular aperture structure, thus increasing its thickness. The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an aperture module includes a base plate configured to have a central opening and include a pivot pin protruding from one corner area of the base plate, a pair of first blades configured to pivot about the pivot pin to form a first aperture diameter smaller than a diameter of the central opening, a pair of second blades configured to pivot about the pivot pin to form a second aperture diameter smaller than the first aperture diameter, a cover plate, comprising a cover guide slot, configured to cover the pair of first blades and the pair of second blades positioned on the base plate, and to be coupled to the base plate, and an aperture driver, comprising a driving pin coupled to a blade slot disposed in either one of the pair of first blades or the pair of second blades and the cover guide slot and configured to move along the cover guide slot.

The aperture driver may further include a shape memory alloy (SMA) wire having at least a first end thereof connected to the driving pin to move the driving pin depending on an electrical signal input.

The cover plate may further include a circuit board positioned in a lower corner area, and the shape memory alloy wire may be configured to have opposite ends thereof connected to the circuit board and a middle portion thereof connected to the driving pin.

The cover plate may further include a circuit board positioned in a lower corner area, and the shape memory alloy wire may be configured to have a first end thereof connected to the circuit board and a second end thereof connected to the driving pin.

The driving pin may include a first driving pin coupled to a pair of first blade slots respectively disposed in the pair of first blades, and a second driving pin coupled to a pair of second blade slots respectively disposed in the pair of second blades, and the shape memory alloy wire may include a first shape memory alloy wire connected to the first driving pin, and a second shape memory alloy wire connected to the second driving pin.

The pivot pin may include a first pivot pin coupled to a pair of pivot pin holes respectively disposed in the pair of first blades, and a second pivot pin coupled to a pair of pivot pin holes respectively disposed in the pair of second blades.

The first pivot pin and the second pivot pin may be positioned in opposite diagonal corner areas of the base plate, respectively.

The first blades may be positioned at different first stages, respectively, and the second blades may be positioned at different second stages, respectively.

The pair of first blades may include a pair of first driving sections overlapping an overlapping area configured to vary depending on a movement of the driving pin, and a pair of first shielding sections semi-annularly extending from the pair of first driving sections, respectively, to form the first aperture diameter. The pair of first blades may include a pair of second driving sections overlapping an overlapping area configured to vary depending on a movement of the driving pin, and a pair of second shielding sections semi-annularly extending from the pair of second driving sections, respectively, to form the second aperture diameter.

Each of the pair of first blades and the pair of second blades may include a metal or a polymer.

The base plate may include a base guide slot disposed in a region corresponding to the cover guide slot.

The cover plate may further include a circuit board positioned in a lower corner area, and a clamp unit may be formed by bending a surface thereof extending from a corner area on which the circuit board is positioned to cover the circuit board.

The base plate may include a stopper pin protruding from a surface thereof, and each of the pair of first blades and the pair of second blades may include a stopper slot coupled to the stopper pin.

The aperture driver may further include a spring member configured to support the driving pin, and apply a repulsive force radially outward of the central opening.

The spring member may include a wire having a circular or polygonal cross-section.

In another general aspect, a camera module includes a housing configured to have an inner space; a lens driving module accommodated in the inner space of the housing; and an aperture module positioned to control light incident on the lens driving module. The aperture module includes a base plate configured to have a central opening and include a pivot pin protruding from one corner area of the base plate; a pair of first blades configured to pivot about the pivot pin to form a first aperture diameter smaller than a diameter of the central opening; a pair of second blades configured to pivot about the pivot pin to form a second aperture diameter smaller than the first aperture diameter; a cover plate, comprising a cover guide slot, configured to cover the pair of first blades and the pair of second blades positioned on the base plate, and to be coupled to the base plate; and an aperture driver, comprising a driving pin coupled to a blade slot disposed in either one of the pair of first blades or the pair of second blades and the cover guide slot and configured to move along the cover guide slot.

The aperture driver may further include a shape memory alloy (SMA) wire having at least a first end thereof connected to the driving pin to move the driving pin depending on an electrical signal input.

The driving pin may include a first driving pin coupled to a pair of first blade slots respectively disposed in the pair of first blades, and a second driving pin coupled to a pair of second blade slots respectively disposed in the pair of second blades. The shape memory alloy wire may include a first shape memory alloy wire connected to the first driving pin, and a second shape memory alloy wire connected to the second driving pin.

The pivot pin may include a first pivot pin coupled to a pair of pivot pin holes respectively disposed in the pair of first blades, and a second pivot pin coupled to a pair of pivot pin holes respectively disposed in the pair of second blades.

In another general aspect, an aperture module includes a base plate including a first pivot pin and a second pivot pin spaced apart from the first pivot pin, wherein the first pivot pin and the second pivot pin are on opposing sides of the base plate; a pair of first blades, disposed on the first pivot pin, configured to pivot about the first pivot pin to form a first aperture diameter smaller than a diameter of a central opening of the base plate; a pair of second blades, disposed on the second pivot pin, configured to pivot about the second pivot pin to form a second aperture diameter different than the first aperture diameter and the central opening of the base plate; a cover plate, comprising a cover guide slot, configured to cover the pair of first blades and the pair of second blades, and to be coupled to the base plate; and an aperture driver, comprising a driving pin coupled to a blade slot disposed in either one of the pair of first blades or the pair of second blades and the cover guide slot and configured to move along the cover guide slot.

The aperture driver may further include a shape memory alloy (SMA) wire coupled to the driving pin to move the driving pin depending on an electrical signal input.

A camera module may include a lens driving module accommodated in an inner space of a housing, and the aperture module positioned within the housing to control light incident on the lens driving module.

Other features and aspects will be apparent from the following detailed description, the drawings, and the claims.

BRIEF DESCRIPTION OF THE DRAWINGS

FIG. 7A to FIG. 8B illustrate views for describing an assembly process of a partial structure of the aperture module illustrated in FIG. 2, where FIG. 7A and FIG. 8A illustrate perspective views, and FIG. 7B and FIG. 8B illustrate bottom perspective views.

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
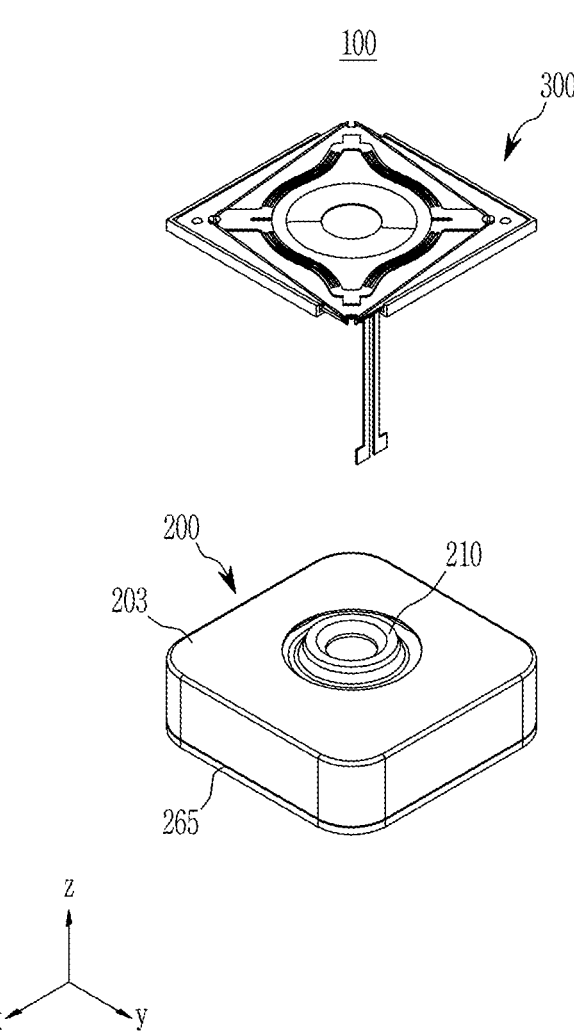
FIG. 1 illustrates a perspective view showing an appearance of a camera module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, means that at least one example exists in which such a feature is included or implemented while all examples are not limited thereto.

Further, throughout the specification, the phrase "in a plan view" means when an object portion is viewed from above, and the phrase "in a cross-sectional view" means when a cross-section taken by vertically cutting an object portion is viewed from the side.

FIG. 1 illustrates a perspective view showing an appearance of a camera module according to an embodiment. FIG.

2 illustrates an exploded perspective view showing an aperture module of the camera module illustrated in FIG. 1.

Figure 2:
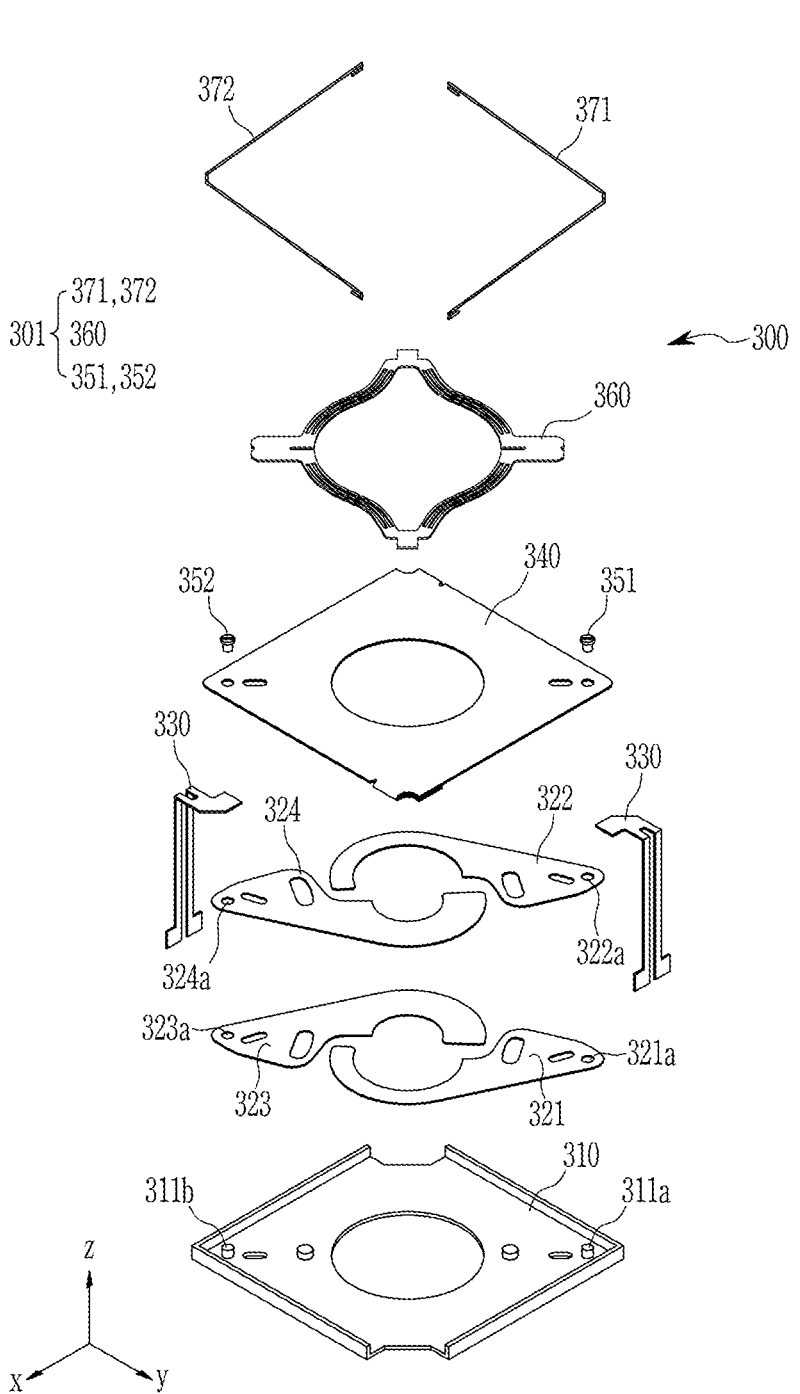
FIG. 2 illustrates an exploded perspective view showing an aperture module of the camera module illustrated in FIG. 1.

Referring to FIG. 1 and FIG. 2, according to the present embodiment, the camera module 100 may include a housing 203 having an inner space, an imaging module 200 including a lens driving module 210 accommodated in the inner space, and an aperture module 300 positioned to control light incident on the lens driving module 210 to adjust a size of an entrance hole.

In the housing 203, the inner space in which the lens driving module 210 is accommodated may be covered with a cover. An image sensor unit may be positioned on a circuit board 265 at a bottom of the housing 203 to generate an electrical image signal in response to incident light information. The circuit board 265 may extend outside the housing 203 to transmit the generated image signal to an external circuit. The lens driving module 210 accommodated in the housing 203 covered with the cover may constitute the imaging module 200.

The lens driving module 210 may include a lens module including a lens and a lens driver configured to drive the lens module in an optical axis direction or in a direction perpendicular to an optical axis.

The lens module may include a lens barrel including a plurality of lenses for imaging a subject and a holder for accommodating the lens barrel. The lens module may be accommodated in a carrier and configured to move in the optical axis direction for auto-focusing. In addition, the lens module may be driven in a direction that is perpendicular to the optical axis for optical image stabilization within the carrier.

The lens driver may include an auto focus (AF) driver configured to drive the lens module together with the carrier in the optical axis direction and an optical image stabilization (OIS) driver configured to drive the lens module in a direction that is perpendicular to the optical axis in the carrier. The AF driver may adjust a focus by moving the lens module in the optical axis direction (z-axis direction in the drawing), and the OIS driver may correct hand shake or screen shake during shooting by moving the lens module in a direction that is perpendicular to the optical axis (x-axis or y-axis direction in the drawing).

For example, the AF driver may include an AF driving magnet and an AF driving coil, and the OIS driver may include an OIS driving magnet and an OIS driving coil. However, the lens driver is not limited thereto, and may be implemented as various driving means capable of moving the lens module in the optical axis direction or in a direction that is perpendicular to the optical axis, which also falls within the scope of the present disclosure.

According to the present embodiment, the aperture module 300 provided in the camera module 100 may be positioned at an upper end of the imaging module 200, and may be provided in front of the lens driving module 210 based on a light incident direction.

The aperture module 300 may be configured by combining a plurality of blade members 321, 322, 323, and 324 while being stacked on a base plate 310 in the optical axis direction. The base plate 310 has a central opening 310a, and may include pivot pins 311a and 311b respectively protruding in the optical axis direction in two corner areas positioned in a diagonal direction. In this case, the blade members 321, 322, 323, and 324 may be classified into a pair of first blades 321 and 322 and a pair of second blades 323 and 324. The pair of first blades 321 and 322 may be coupled to the first pivot pin 311a, and the pair of second blades 323 and 324 may be coupled to the second pivot pin 311b. To this end, the first blades 321 and 322 and the second blades 323 and 324 may respectively include pivot pin holes 321a, 322a, 323a, and 324a.

The base plate 310 may be formed by being recessed in its entire surface area in the optical axis direction except for a frame along its edge. A cover plate 340 may be coupled to an upper end of the base plate 310 for cover to protect components of the aperture module 300, for example. The recessed depth of the base plate 310 may be equal to or, at least, greater than a thickness in which the first blades 321 and 322 and the second blades 323 and 324 are stacked.

In the aperture module 300, an aperture driver 301 is positioned on the cover plate 310 to provide a driving force to the first blades 321 and 322 and the second blades 323 and 324. The aperture driver 301 may include driving pins 351 and 352, a spring member 360, and shape memory alloy (SMA) wires 371 and 372.

At least, first ends of the shape memory alloy wires 371 and 372 are connected to a circuit board 330 to electrically induce contraction or expansion to linearly reciprocate the driving pins 351 and 352 within a guide slot. The driving pins 351 and 352 may include a first driving pin 351 and a second driving pin 352 that are respectively coupled to the first blades 321 and 322 and the second blades 323 and 324 on the cover plate 340 to provide a driving force. Accordingly, a linear reciprocating motion of the driving pins 351 and 352 may be converted into a pivotal movement of the first blades 321 and 322 and the second blades 323 and 324, thereby adjusting the size of the entrance hole of the aperture module 300. The shape memory alloy wires 371 and 372 may include an alloy of nickel and/or titanium. The circuit board 330 may be a flexible printed circuit (FPC).

In the aperture module 300 according to the present embodiment, the pair of first blades 321 and 322 and the pair of second blades 323 and 324 may be configured to form apertures having different diameters. Blade members 321 and 322 constituting the pair of first blades 321 and 322 may be positioned in two stages or levels to be coupled to the first pivot pin 351. Blade members 323 and 324 constituting the pair of second blades 323 and 324 may also be positioned in two stages or levels to be coupled to the second pivot pin 352.

Specifically, the pair of first blades 321 and 322 includes a lower blade member 321 and an upper blade member 322, and the upper blade member 322 may be positioned on the lower blade member 321. In addition, the pair of second blades 323 and 324 may include a lower blade member 323 and an upper blade member 324, and the upper blade member 324 may be positioned on the lower blade member 323. In this case, the lower blade member 321 of the first blades 321 and 322 and the lower blade member 323 of the second blades 323 and 324 may be positioned at opposite sides about a diagonal reference line connecting the first pivot pin 351 and the second pivot pin 352, and may be positioned on at a same layer. Similarly, the upper blade member 322 of the first blade 321 and 322 and the upper blade member 324 of the second blades 323 and 324 are also positioned at opposite sides about the diagonal reference line, and may be positioned on a same layer. Accordingly, mutual interference may be avoided when the pair of first blades 321 and 322 or the pair of second blades 323 and 324 rotate to form an opening of the aperture.

The pair of first blades 321 and 322 and the pair of second blades 323 and 324 may include a metal or a polymer, and a treatment such as color coating may be performed to prevent light transmission. The blade members 321, 322, 323, and 324 including a metal may have high rigidity, and the blade members 321, 322, 323, and 324 including a polymer may be easily manufactured to have a thin thickness.

Although the above-described embodiment has illustrated and described that the aperture module is positioned at an upper end of the imaging module, the present disclosure is not limited thereto. Accordingly, the aperture module provided in the camera module according to another embodiment may be positioned inside the imaging module.

Figure 3:
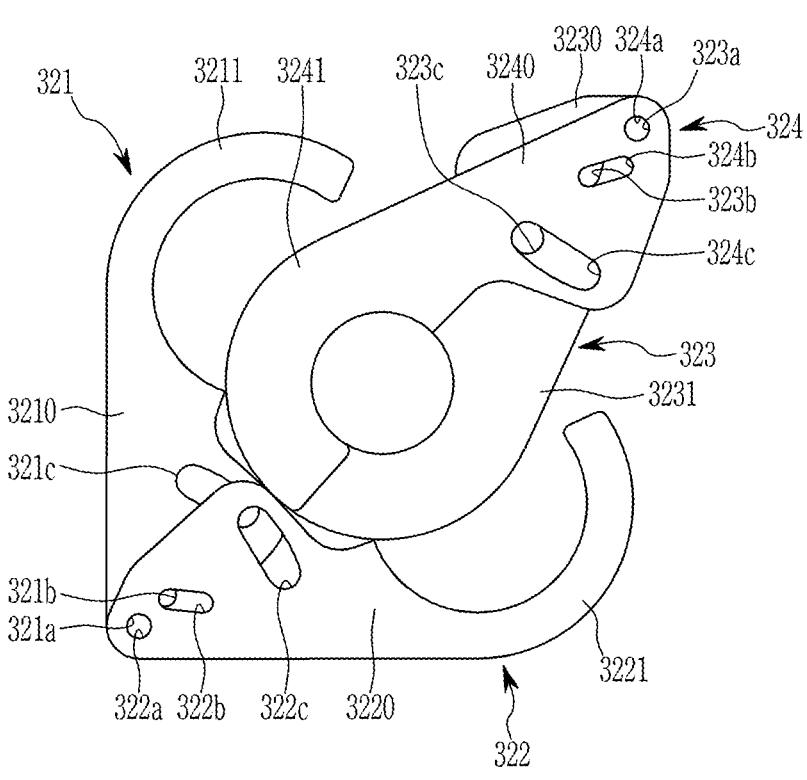
FIG. 3 illustrates a top plan view showing a structure of a blade applied to the aperture module illustrated in FIG. 2.
Figure 4:
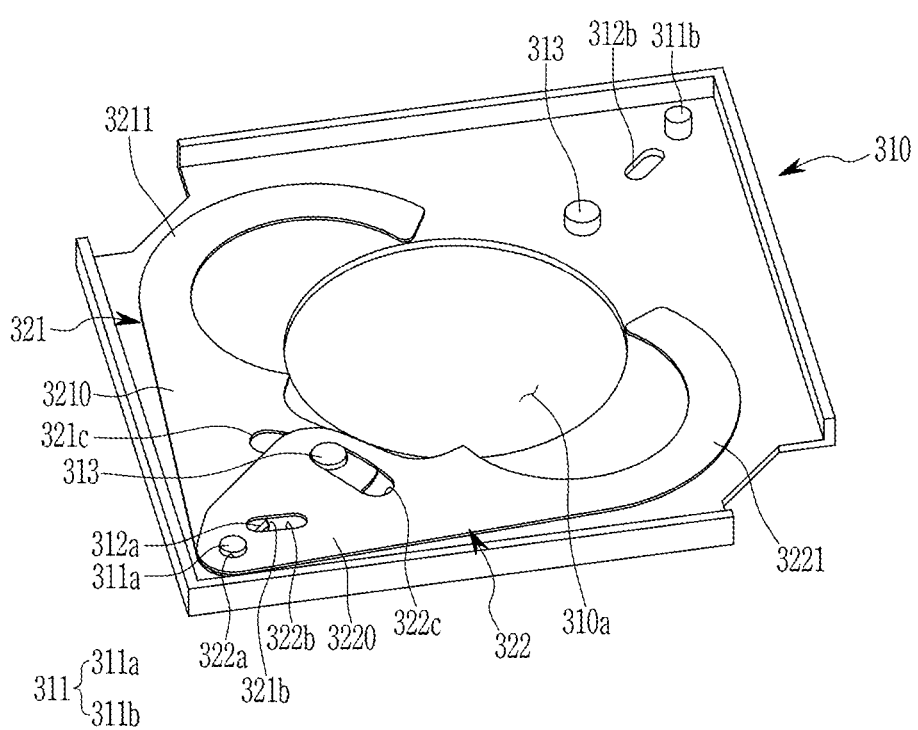
FIG. 4 and FIG. 5 each illustrate a perspective view showing a state in which a blade of the aperture module illustrated in FIG. 2 is positioned in a base plate.
Figure 5:
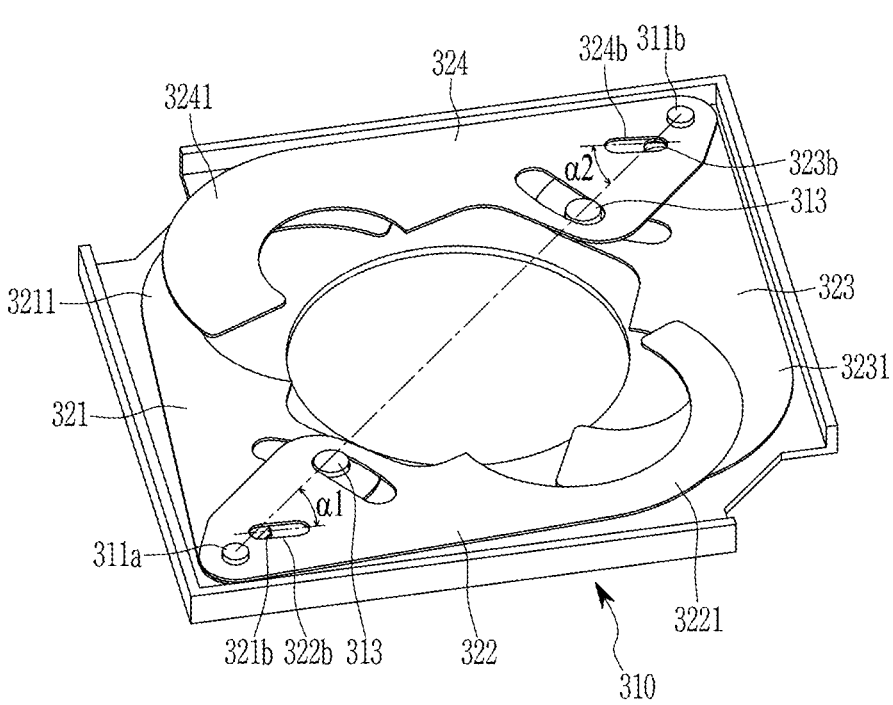

FIG. 3 illustrates a top plan view showing a structure of a blade applied to the aperture module illustrated in FIG. 2. FIG. 4 and FIG. 5 each illustrate a perspective view showing a state in which a blade of the aperture module illustrated in FIG. 2 is positioned in a base plate. FIG. 4 illustrates a state in which the first blades 321 and 322 are assembled. FIG. 5 illustrates a state in which all of the first blades 321 and 322 and the second blades 323 and 324 are assembled.

The pair of first blades 321 and 322 may include a pair of overlapping first driving sections 3210 and 3220 having an overlapping area that is changed depending on a movement of the driving pins 351 and 352. A pair of first shielding sections 3211 and 3221 respectively extending semi-annularly from the pair of first driving sections 3210 and 3220 to form an aperture having a smaller diameter than a central opening 310a. The pair of second blades 323 and 324 may include a pair of overlapping second driving sections 3230 and 3240 having an overlapping area that is changed depending on a movement of the driving pins 351 and 352. A pair of second shielding sections 3231 and 3241 respectively extending semi-annularly from the pair of second driving sections 3230 and 3240 to form an aperture having a smaller diameter than that of the aperture formed by the pair of first shielding sections 3211 and 3221.

The driving sections 3210, 3220, 3230, and 3240 of the blade members may include pivot pin holes 321a, 322a, 323a, and 324a coupled to pivot pins 311a and 311b of the base plate 310, and guide slots 321b, 322b, 323b, and 324b to which the driving pins 351 and 352 are coupled to move together.

A pair of pivot pin holes 321a and 322a respectively disposed in the pair of first blades 321 and 322 are coupled to the first pivot pin 311a. A pair of pivot pin holes 323a and 324a respectively disposed in the pair of second blades 323 and 324 may be coupled to the second pivot pin 311b.

The blade slots 321b, 322b, 323b, and 324b may extend in a straight line. The blade slots 321b, 322b, 323b, and 324b may include a pair of first blade slots 321b and 322b respectively disposed in the pair of first blades 321 and 322, and a pair of second blade slots 323b and 324b disposed in the pair of second blades 323 and 324. The pair of first blade slots 321b and 322b or the pair of second blade slots 323b and 324b may be configured to form line symmetry with each other based on a diagonal reference line connecting the first pivot pin 311a and the second pivot pin 311b.

Referring to FIG. 5, a first angle $\alpha 1$ formed by an imaginary straight line passing through the center of any one of the pair of first blade slots 321b and 322b and the diagonal reference line may be different from a second angle $\alpha 2$ between an imaginary straight line passing through the center of any one of the pair of second blade slots 323b and 324b and the diagonal reference line. The angles $\alpha 1$ and $\alpha 2$ may be determined by design factors such as the size of the diaphragm diameter formed by the shielding sections 3211, 3221, 3231, and 3241, and initial positions and movement distances of the driving pins 351 and 352.

The base plate 310 may include a first base guide slot 312a that moves along with the first driving pin 351 coupled to an edge region where the first pivot pin 311*a* is disposed. In addition, the base plate 310 may include a second base guide slot 312*b* that moves along with the second driving pin 352 coupled to a corner region where the second pivot pin 311*b* is disposed. The base guide slots 312*a* and 312*b* may extend in a straight line along a diagonal reference line direction. An imaginary straight line passing through a center of the base guide slots 312*a* and 312*b* in a width direction and an imaginary straight line passing through a center of each of the blade slots 321*b*, 322*b*, 323*b*, and 324*b* in a width direction may cross each other.

The drive sections 3210, 3220, 3230, and 3240 of the blade members may respectively include stopper holes 321*c*, 322*c*, 323*c*, and 324*c* coupled to a stopper pin 313 of the base plate 310. The stopper pin 313 may protrude from one surface of the base plate 310 to a height at which the first blades 321 and 322 and the second blades 323 and 324 are stacked. The stopper pin 313 may have a circular cross-section, and as another example, may have an elliptical or polygonal cross-section. As the stopper pin 313 and the stopper holes 321*c*, 322*c*, 323*c*, and 324*c* come into contact with each other, a driving range of each of the blade members 321, 322, 323, and 324 may be limited, and the blade members 321, 322, 323, and 324 may precisely move to a predetermined position.

The blade members 321, 322, 323, and 324 are respectively driven to rotate about pivot pin holes 321*a*, 322*b*, 323*b*, and 324*b* of the driving section, and accordingly, the shielding sections 3211, 3221, 3231, and 3241 may partially shield the central opening 310*a* of the base plate 310.

Specifically, the shielding sections 3211 and 3221 of the pair of first blades may be rotated about the first pivot pin 311*a* as the first driving pin 351 moves, and a first aperture diameter may be formed by partially shielding the central opening 310*a* of the base plate 310 from an edge thereof. Accordingly, the first aperture diameter may have a smaller diameter than that of the central opening 310*a*.

In addition, the shielding sections 3231 and 3241 of the pair of second blades may be rotated about the second pivot pin 311*b* as the second driving pin 352 moves, and a second aperture diameter may be formed by partially shielding the central opening 310*a* of the base plate 310 from an edge thereof. Herein, the shielding sections 3211 and 3221 of the pair of first blades may be thinner than the shielding sections 3231 and 3241 of the second pair of blades. Accordingly, the second aperture diameter may have a smaller diameter than that of the central aperture 310*a* and the first aperture diameter.

Figure 6:
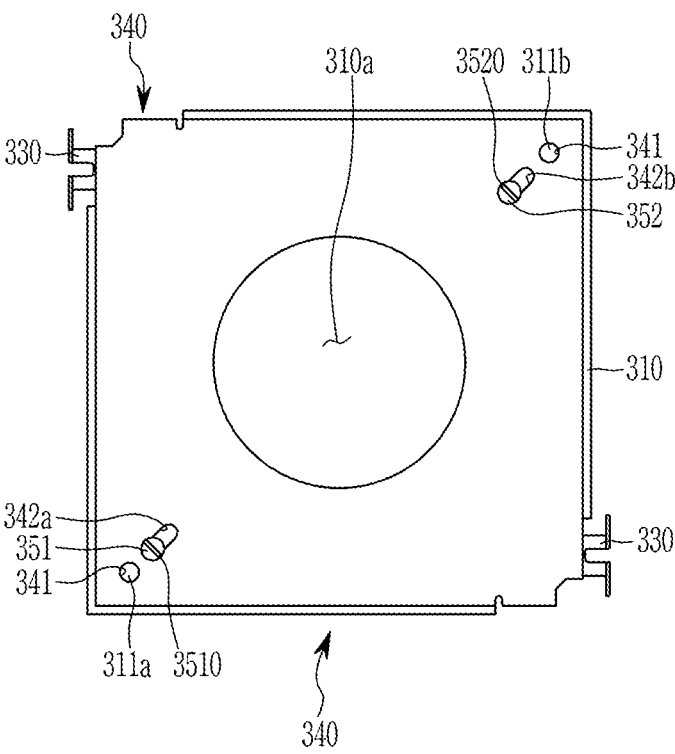
FIG. 6 illustrates a top plan view showing a cover plate, a driving pin, and a circuit board applied to the aperture module illustrated in FIG. 2.

FIG. 6 illustrates a top plan view showing a cover plate, a driving pin, and a circuit board applied to the aperture module illustrated in FIG. 2. FIG. 7A to FIG. 8B illustrate an assembly process of a partial structure of the aperture module illustrated in FIG. 2.

Figure 7A:
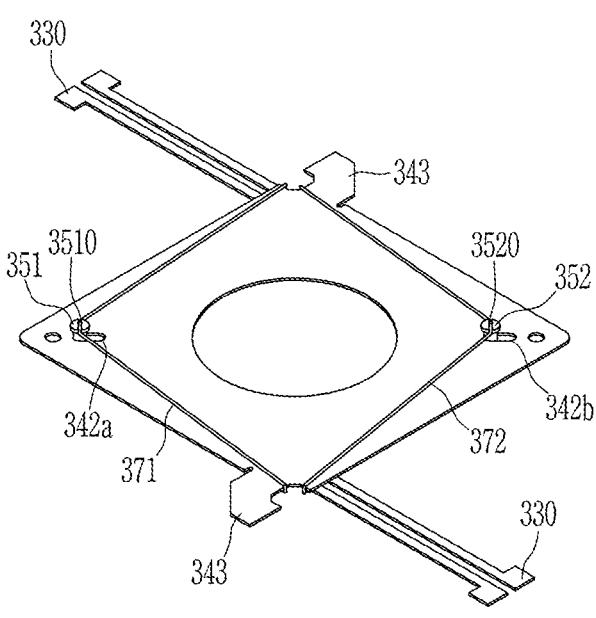
Figure 7B:
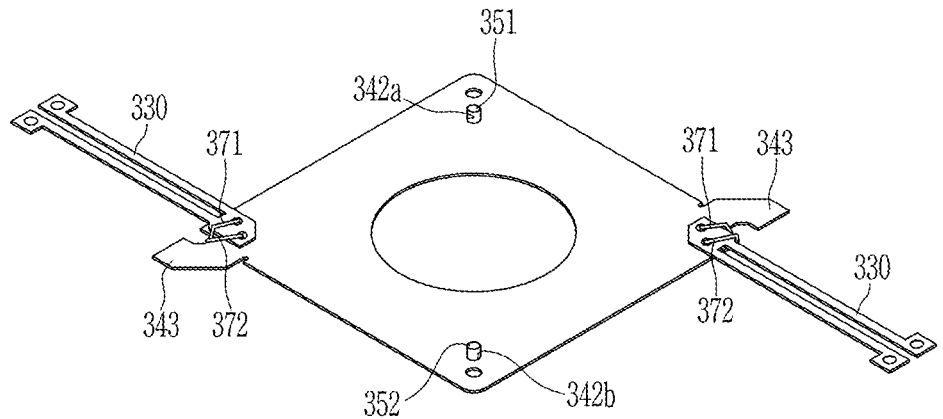
Figure 8A:
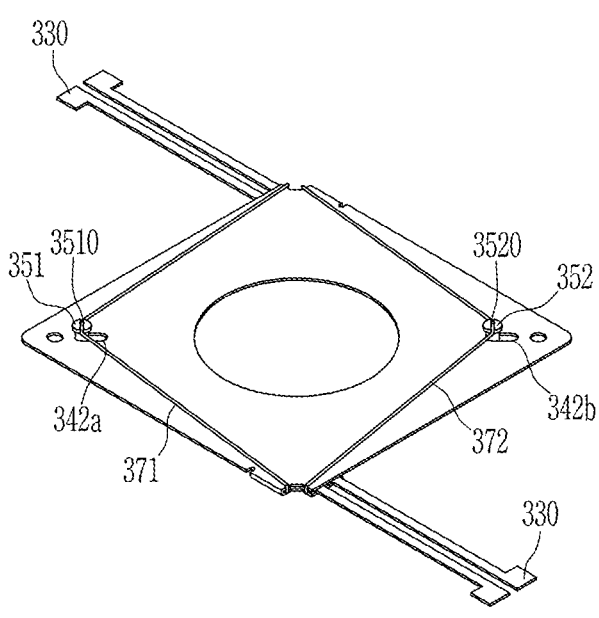
Figure 8B:
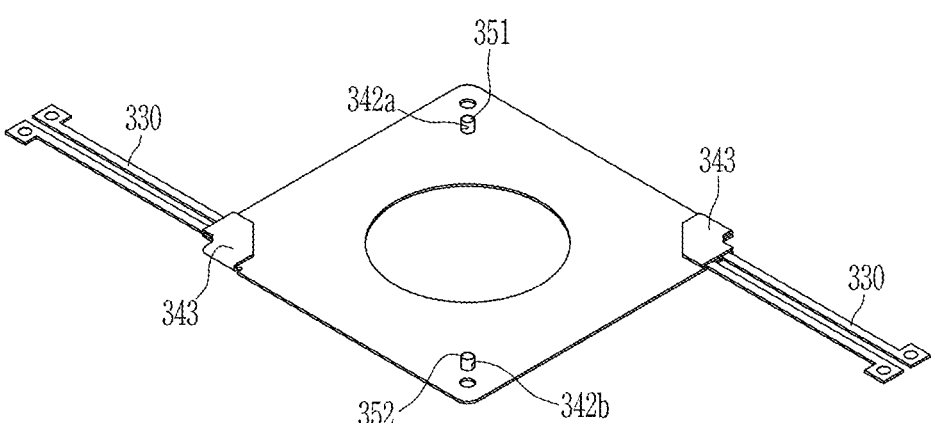

FIG. 7A illustrates a plan perspective view of the cover plate 340 in a state in which a clamp unit 343 is unfolded during an assembly process of an aperture module 300. FIG. 7B illustrates a bottom perspective view of the cover plate 340 in a state in which a clamp unit 343 is unfolded during the assembly process of the aperture module 300. FIG. 8A illustrates a plan perspective view of the cover plate 340 in a state in which the clamp unit 343 is folded in the completed aperture module 300, and FIG. 8B illustrates a bottom perspective view of the cover plate 340 in a state in which the clamp unit 343 is folded in the completed aperture module 300.

Referring to FIG. 6, the cover plate 340 may be configured to cover the pair of first blades 321 and 322 and the pair of second blades 323 and 324 positioned on the base plate 310, and to be coupled to the base plate 310. The cover plate 340 may have a central opening 310*a*, and may have a substantially quadrangular or square planar shape.

The cover plate 340 may include a cover pivot pin hole 341 disposed at a position corresponding to the pivot pins 311*a* and 311*b* such that the pivot pins 311*a* and 311*b* protruding from the base plate 310 can be inserted thereto. The cover pivot pin hole 341 may be positioned at opposite corners of the cover plate 340 so as to be coupled to the first pivot pin 311*a* or the second pivot pin 311*b*, respectively, positioned in both diagonal corner areas of the base plate 310.

The cover plate 340 may have cover guide slots 342*a* and 342*b* that are spaced apart from the cover pivot pin hole 341 and extend linearly toward a center of the central opening 310*a*. That is, the cover guide slots 342*a* and 342*b* may extend by a distance that is set in a diagonal direction from one corner area of the cover plate 340. The cover guide slots 342*a* and 342*b* may include a first cover guide slot 342*a* coupled to the first driving pin 351 and a second cover guide slot 342*b* coupled to the second driving pin 352 in opposite edge areas of the cover plate 340 in the diagonal direction.

The first and second driving pins 351 and 352 may be respectively positioned so as to be coupled to the cover guide slots 342*a* and 342*b* and the pair of first blade slots 321*b* and 322*b* or the pair of second blade slots 323*b* and 324*b*, and may reciprocate linearly along mating slots. That is, the first driving pin 351 may be positioned to be coupled with a pair of first blade slots 321*b* and 322*b*, and the second driving pin 352 may be positioned to be coupled with a pair of second blade slots 323*b* and 324*b*. In addition, the first and second driving pins 351 and 352 may be respectively coupled with the first base guide slot 312*a* and the second base guide slot 312*b* disposed in the base plate 310, and thus the base guide slots 312*a* and 312*b* may be disposed in regions corresponding to the cover guide slots 342*a* and 342*b* of the base plate 310.

The first and second driving pins 351 and 352 may each be in a form of a cylinder in which a disk having a larger diameter is combined on an upper surface thereof, and grooves 3510 and 3520 may be configured such that first and second shape memory alloy wires 371 and 372 may be positioned on upper surfaces thereof.

The shape memory alloy wires 371 and 372 may be seated in the grooves 3510 and 3520 disposed on the upper surfaces of the driving pins 351 and 352. The shape memory alloy wire 370 may include a first shape memory alloy wire 371 connected to the first driving pin 351, and a second shape memory alloy wire 372 connected to the second driving pin 352.

The circuit board 330 for supplying power to the shape memory alloy wires 371 and 372 may be attached to the lower surface of the cover plate 340 using an adhesive, for example. The circuit board 330 may be attached to one corner area of a lower surface of the cover plate 340 so as to be symmetrical in a diagonal direction of the cover plate 340 with respect to a center of the central opening 310*a*. Herein, the corner area to which the circuit board 330 is attached may oppose corner areas adjacent to a corner where the cover pivot pin hole 341 and the cover guide slit 342 are disposed.

Opposite ends of the shape memory alloy wires 371 and 372 may be connected to the circuit board 330, and the connection may be performed by additionally using a conductive material in order to secure conductivity between the shape memory alloy wires 371 and 372 and the circuit board 330. Portions except for the opposite ends of the shape memory alloy wires 371 and 372 may be coupled to the driving pins 351 and 352 and are disposed on the upper surface of the cover plate 340. The opposite ends of the shape memory alloy wires 371 and 372 may be wound down an upper surface of the cover plate 340 to be connected to the circuit board 330 on a lower surface to which the circuit board 330 is attached.

Referring to FIG. 7 and FIG. 8, the cover plate 340 may include a clamp unit 343 as a structure for increasing a bonding force between the circuit board 330, the cover plate 340, and the shape memory alloy wires 371 and 372. The clamp unit 343 may be formed by bending one surface extending from one corner area of the cover plate 340 on which the circuit board 330 is positioned to cover the circuit board 330.

Before assembling, the clamp unit 343 may include a plane having a wing shape protruding outward from one corner area of the cover plate 340. The clamp unit 343 may be disposed to be symmetrical in a diagonal direction of the cover plate 340 with respect to a center of the central opening 310a. As illustrated in FIG. 7, the clamp unit 343 in an unfolded state before assembling may be folded toward the lower surface of the cover plate 340 in a completed state of the aperture module 300 as illustrated in FIG. 8. In FIG. 8, first ends of the shape memory alloy wires 371 and 372, and the circuit board 330, may be positioned between the clamp unit 343 and the lower surface of the cover plate 343, and thus coupling between these components may be strengthened.

Figure 9:
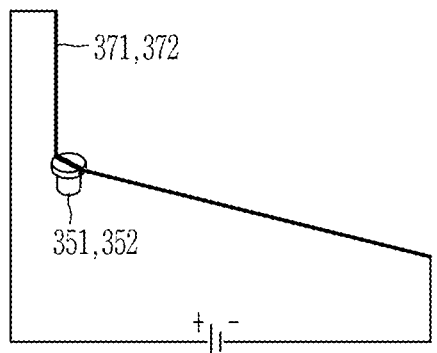
FIG. 9 illustrates a connection structure of a shape memory alloy wire applied to the aperture module illustrated in FIG. 2 according to an embodiment.
Figure 10:
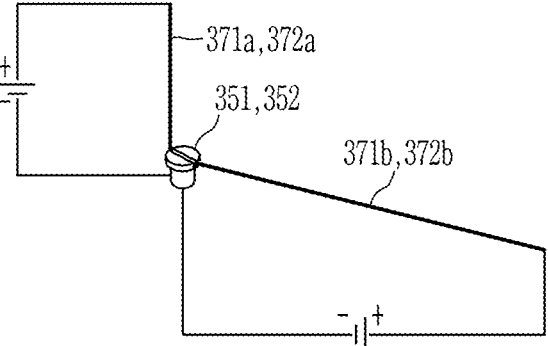
FIG. 10 illustrates a connection structure of a shape memory alloy wire applied to an aperture module according to an embodiment.

FIG. 9 illustrates a connection structure of a shape memory alloy wire applied to the aperture module illustrated in FIG. 2 according to an embodiment, and FIG. 10 illustrates a connection structure of a shape memory alloy wire applied to an aperture module according to an embodiment.

Referring to FIG. 9, the shape memory alloy wires 371 and 372 may be configured such that opposite ends are connected to the circuit board 330, and a middle portion thereof is connected to the driving pins 351 and 352. Accordingly, the shape memory alloy wires 371 and 372 connected to one driving pin 351 and 352 may be controlled through an electrical signal depending on one circuit.

Referring to FIG. 10, shape memory alloy wires 371a, 371b, 372a, and 372b may be configured such that first ends are connected to the circuit board 330 and second ends are connected to the driving pins 351 and 352. Accordingly, the two shape memory alloy wires 371a, 371b, 372a, and 372b connected to one driving pin 351 and 352 may be controlled through electrical signals depending on respective circuits.

Figure 11:
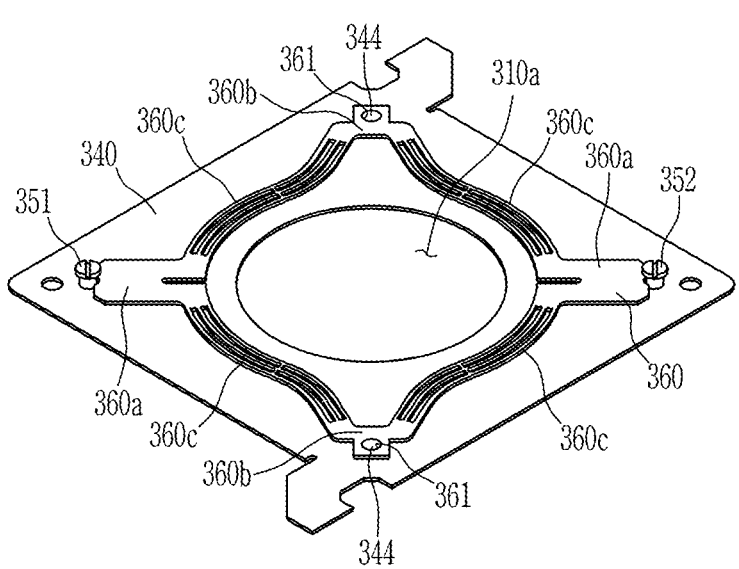
FIG. 11 illustrates a top plan view showing a state in which a spring member is positioned in a cover plate of the aperture module illustrated in FIG. 2.
Figure 12:
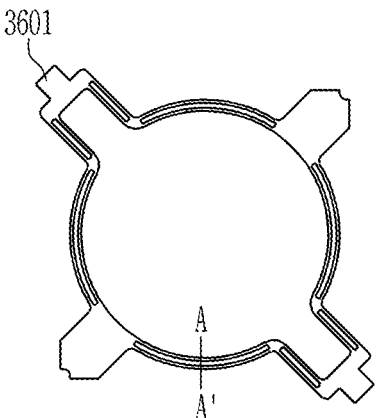
FIG. 12 to FIG. 15 each illustrate a top plan view showing various modifications of a spring member applied to the aperture module illustrated in FIG. 2.
Figure 13:
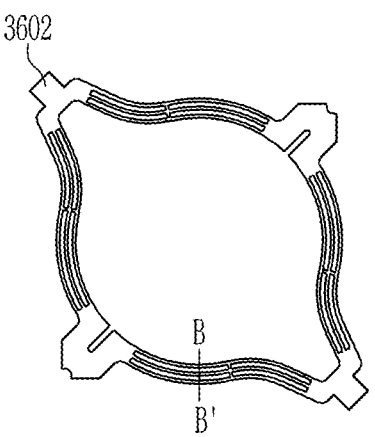
Figure 14:
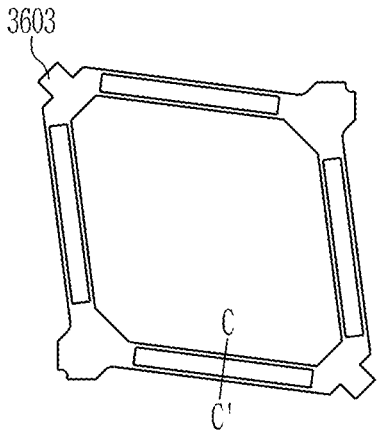
Figure 15:
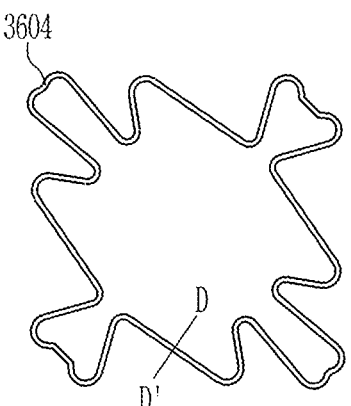

FIG. 11 illustrates a top plan view showing a state in which a spring member is positioned in a cover plate of the aperture module illustrated in FIG. 2, and FIG. 12 to FIG. 15 each illustrate a top plan view showing various modifications of a spring member applied to the aperture module illustrated in FIG. 2.

The aperture driver 301 may include a spring member 360 supporting the driving pins 351 and 352 on the upper surface of the cover plate 340. The spring member 360 may be configured to apply a repulsive force radially outward of the central opening 310a against the driving pins 351 and 352.

Specifically, the spring member 360 may have a structure in which a support end 360a and a fixed end 360b are connected by an elastic support body 360c. In this case, the support end 360a of the spring member 360 may be positioned in a pivot corner area where the pivot pins 311a and 311b are positioned so as to contact the driving pins 351 and 352. The fixed end 360b of the spring member 360 may be fixed to a fixed end corner area adjacent to the pivot corner area on the cover plate 340.

In addition, the fixed end 360b and the elastic support body 360c of the spring member 360 may be symmetrically connected to opposite sides of a pair of support ends 360a. Accordingly, a pair of fixed ends 360b may be fixed to the fixed end corner areas positioned at opposite sides of the central opening 310a, and a pair of elastic supports 360c may be positioned in a substantially circular or quadrangular shape to surround the central opening 310a to the outside of the central opening 310a.

Referring to FIG. 12 to FIG. 15, the spring member 360 may have a structure of various shapes including a leaf spring or a circular wire. For example, spring members 3601, 3602, and 3603 may each include a leaf spring, and a cross-section taken along a line A-A', B-B', or C-C' may be quadrangular. As another example, a spring member 3604 may include a wire, and a cross-section taken along the line D-D' may be circular or polygonal.

The spring member 360 may include a fixing hole 361 in the fixing end 360b. The fixing hole 361 may be inserted into a fixing pin 344 protruding from the base plate 340, and thus the spring member 360 may be more strongly fixed to the base plate 340.

When the driving pins 351 and 352 are driven to move radially inward of the central opening 310a by the shape memory alloy wires 371 and 372, the spring member 360 may cause the driving pins 351 and 352 to move radially outward of the central opening 310a.

Figure 16A:
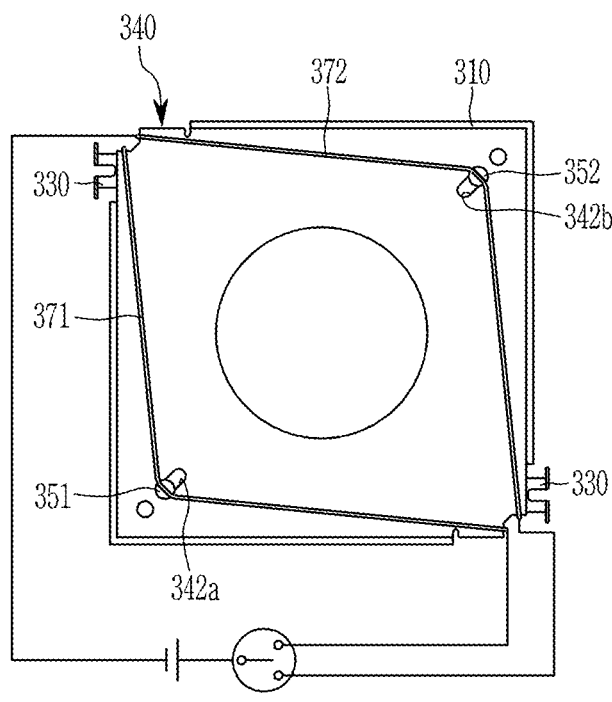
FIG. 16A to FIG. 18B illustrate views for describing a driving process of the aperture module illustrated in FIG. 2.
Figure 16B:
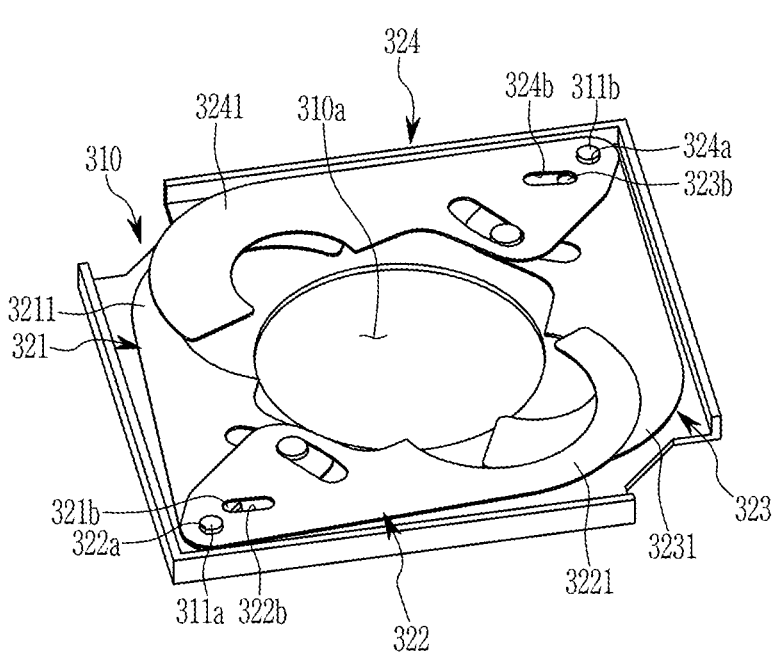
Figure 17A:
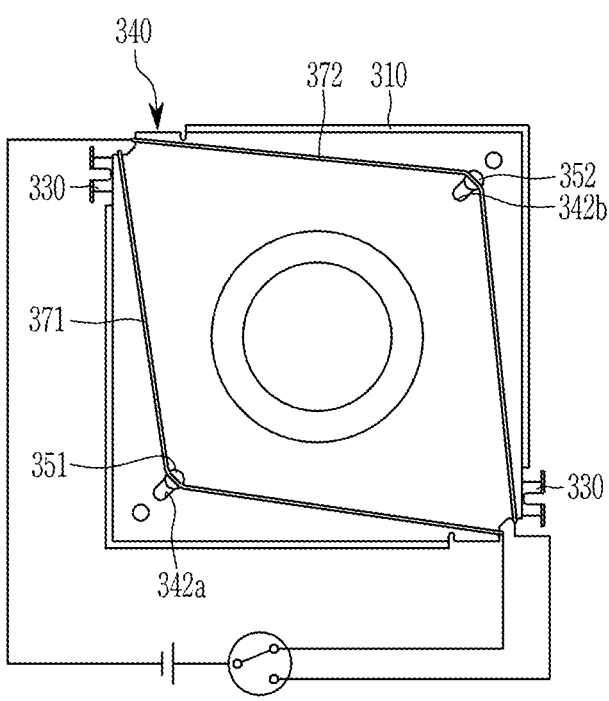
Figure 17B:
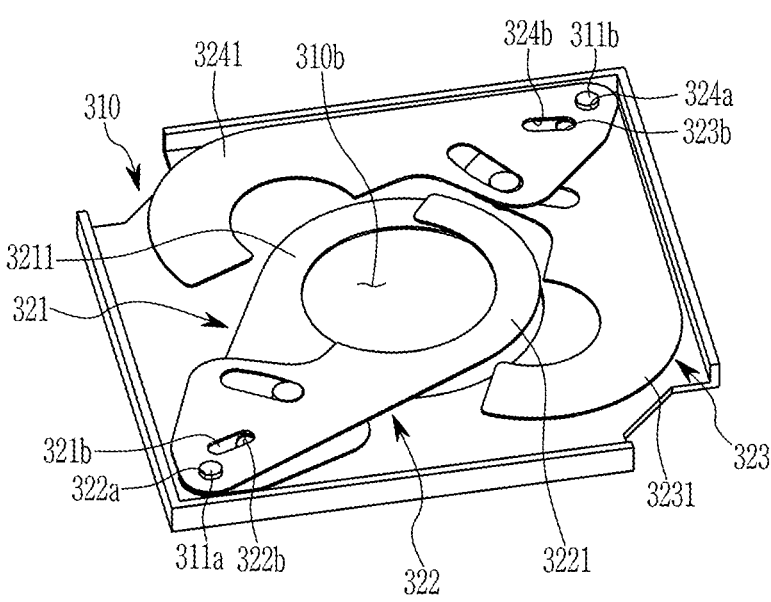
Figure 18A:
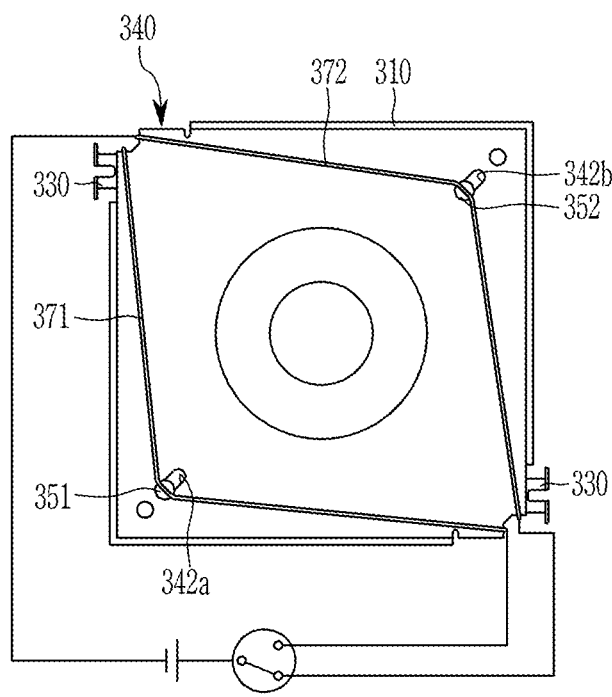
Figure 18B:
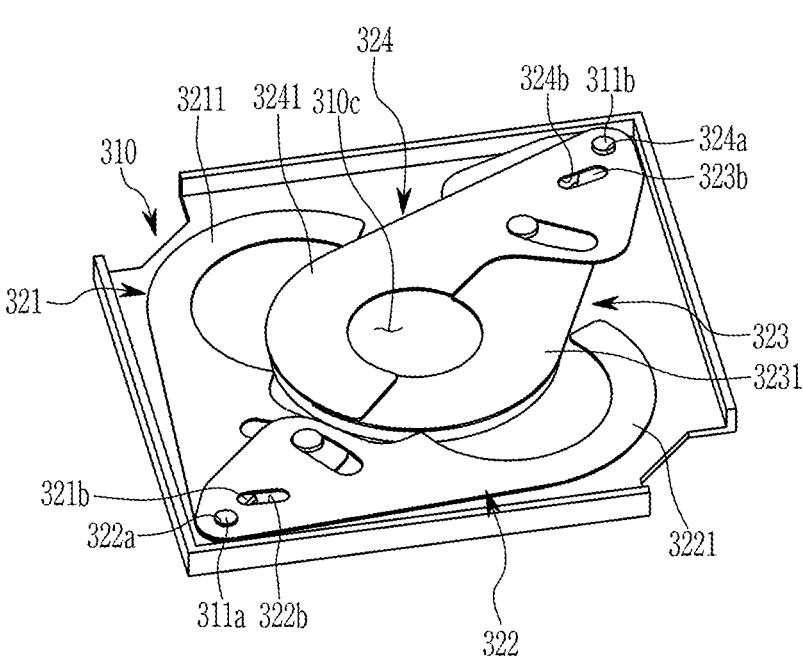

FIG. 16A to FIG. 18B illustrate views for describing a driving process of the aperture module illustrated in FIG. 2. FIGS. 16A-B, FIGS. 17A-B, and FIGS. 18A-B illustrate states of the first blades 321 and 322 and the second blades 323 and 324 when the aperture module 300 is in a large aperture state, a middle aperture state, and a small aperture state, respectively. FIG. 16A, FIG. 17A, and FIG. 18A each illustrate a top plan view of the aperture module 300 in each state. FIG. 16B, FIG. 17B, and FIG. 18B each illustrate a state in which a blade is positioned on a base plate in each state.

Referring to FIG. 16A, when power is not applied in an initial state of the aperture module 300, i.e., when an entrance hole is fully open, the first driving pin 351 may be positioned in a first cover guide slot 342a and first blade slots 321b and 322b of the first blades 321 and 322, and the second driving pin 352 may be positioned in a second cover guide slot 342a and second blade slots 323b and 324b of the second blades 323 and 324. The shape memory alloy wires 371 and 372 of the aperture driver 301 connected to the driving pins 351 and 352 may also be supported by the driving pins 351 and 352 in an initial state to which no electric signal is applied. Specifically, the first shape memory alloy wire 371 connected to the first driving pin 351 and the second shape memory alloy wire 372 connected to the second driving pin 352 may all be positioned in an initial state position.

In this case, the pair of first blades 321 and 322 and the pair of second blades 323 and 324 may be positioned such that there is no overlapping portion with the central opening 310a by being spread apart from opposite sides of the central opening 310a. Accordingly, the aperture module 300 may form a large aperture state having an entrance hole as large as the central opening 310a.

Referring to FIG. 17A, when an electrical signal is applied through a switch in the middle aperture state, the first driving pin 351 may move within a slot along the first cover guide slot 342a and the first blade slot 321b and 322b or along the first cover guide slot 342a and the first blade slots 321b and 322b and the first base guide slot 312a. Movement of the first driving pin 351 may be implemented while the first shape memory alloy wire 371 contracts as an electrical signal is applied. The first shape memory alloy wire 371 may move the first driving pin 351 in a radial direction of the central opening 310a. Herein, the second shape memory alloy wire 372 connected to the second driving pin 352 may be in an initial state in which no electrical signal is applied.

Accordingly, the first driving pin 351 may rotate the first blades 321 and 322, but the second driving pin 352 may not rotate the second blades 323 and 324. When the first driving pin 351 moves from outer ends of the first blade slots 321b and 322b to radially inner ends of the central opening 310a, the first shielding sections 3211 and 3221 of the pair of first blades 321 and 322 may meet each other to form an aperture of a first aperture 310b having a smaller diameter than the central opening 310a.

Referring to FIG. 18A, when another electrical signal is applied through a switch in the small aperture state, the second driving pin 352 may move within a slot along the second cover guide slot 342b and the second blade slot 323b and 324b or along the second cover guide slot 342b and the second blade slots 323b and 324b and the second base guide slot 312b. Movement of the second driving pin 352 may be implemented while the first shape memory alloy wire 372 contracts as an electrical signal is applied. The second memory alloy wire 372 may move the second driving pin 352 in a radial direction of the central opening 310a. Herein, the first shape memory alloy wire 371 connected to the first driving pin 351 may be in an initial state in which no electrical signal is applied.

Accordingly, the second driving pin 352 may rotate the second blades 323 and 324, but the first driving pin 351 may not rotate the first blades 321 and 322. When the second driving pin 352 moves from outer ends of the second blade slots 323b and 324b to radially inner ends of the central opening 310a, the second shielding sections 3231 and 3241 of the pair of second blades 323 and 324 may meet each other to form an aperture of a second aperture 310c having a smaller diameter than the central opening 310a.

As described above with reference to FIG. 16A to FIG. 18B, the aperture module 300 according to an embodiment has a large-aperture diameter, a medium-aperture diameter, and a small-aperture diameter may be selectively implemented, and a 3-stage variable aperture may be implemented with open-loop control. In addition, the aperture module 300 according to an embodiment may precisely adjust a blade through a closed-loop control that adjusts resistance or current of the shape memory alloy wires 371 and 372.

An aspect of the present disclosure has been made in an effort to provide an aperture module and a camera module including the same, capable of implementing a three-step aperture state by rotating a blade using a shape memory alloy wire.

In accordance with the aperture module according to an embodiment, the aperture module may be easily positioned even in the middle of a lens group, and the size and thickness of the aperture module may be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An aperture module comprising:
   a base plate configured to have a central opening and include a pivot pin protruding from, at least, one corner area of the base plate;
   a pair of first blades configured to pivot about the pivot pin to form a first aperture diameter smaller than a diameter of the central opening;
   a pair of second blades configured to pivot about the pivot pin to form a second aperture diameter smaller than the first aperture diameter;
   a cover plate, comprising a cover guide slot, configured to cover the pair of first blades and the pair of second blades positioned on the base plate, and to be coupled to the base plate; and
   an aperture driver, comprising a shape memory alloy (SMA) wire and a driving pin coupled to a blade slot disposed in either one of the pair of first blades or the pair of second blades and the cover guide slot and configured to move along the cover guide slot,
   wherein the driving pin comprises a groove disposed on an upper surface thereof, the groove receiving the SMA wire, and the SMA wire is coupled to the driving pin and configured to drive the driving pin.

2. The aperture module of claim 1, wherein
   at least a first end of the SMA wire is seated in the groove on the upper surface of the driving pin and extends laterally from the driving pin to move the driving pin depending on an electrical signal input.

3. The aperture module of claim 2, wherein
   the cover plate further includes a circuit board positioned in a lower corner area, and
   the shape memory alloy wire is configured to have opposite ends thereof connected to the circuit board and a middle portion thereof connected to the driving pin.

4. The aperture module of claim 2, wherein
   the cover plate further includes a circuit board positioned in a lower corner area, and
   the shape memory alloy wire is configured to have a first end thereof connected to the circuit board and a second end thereof connected to the driving pin.

5. The aperture module of claim 2, wherein
   the driving pin includes a first driving pin coupled to a pair of first blade slots respectively disposed in the pair of first blades, and a second driving pin coupled to a pair of second blade slots respectively disposed in the pair of second blades, and
   the shape memory alloy wire includes a first shape memory alloy wire connected to the first driving pin, and a second shape memory alloy wire connected to the second driving pin.

6. The aperture module of claim 1, wherein
   the pivot pin includes a first pivot pin coupled to a pair of pivot pin holes respectively disposed in the pair of first blades, and a second pivot pin coupled to a pair of pivot pin holes respectively disposed in the pair of second blades.

7. The aperture module of claim 6, wherein the first pivot pin and the second pivot pin are positioned in opposite diagonal corner areas of the base plate, respectively.

8. The aperture module of claim 1, wherein the first blades are positioned at different first stages, respectively, and the second blades are positioned at different second stages, respectively.

9. The aperture module of claim 1, wherein the pair of first blades includes a pair of first driving sections overlapping an overlapping area configured to vary depending on a movement of the driving pin, and a pair of first shielding sections semi-annularly extending from the pair of first driving sections, respectively, to form the first aperture diameter, and the pair of first blades includes a pair of second driving sections overlapping an overlapping area configured to vary depending on a movement of the driving pin, and a pair of second shielding sections semi-annularly extending from the pair of second driving sections, respectively, to form the second aperture diameter.

10. The aperture module of claim 1, wherein each of the pair of first blades and the pair of second blades include a metal or a polymer.

11. The aperture module of claim 1, wherein the base plate includes a base guide slot disposed in a region corresponding to the cover guide slot.

12. The aperture module of claim 1, wherein the cover plate further includes a circuit board positioned in a lower corner area, and a clamp unit formed by bending a surface thereof extending from a corner area on which the circuit board is positioned to cover the circuit board.

13. The aperture module of claim 1, wherein the base plate includes a stopper pin protruding from a surface thereof, and each of the pair of first blades and the pair of second blades includes a stopper slot coupled to the stopper pin.

14. The aperture module of claim 1, wherein the aperture driver further includes a spring member configured to support the driving pin, and apply a repulsive force radially outward of the central opening.

15. The aperture module of claim 14, wherein the spring member includes a wire having a circular or polygonal cross-section.

16. A camera module comprising:

a housing configured to have an inner space;

a lens driving module accommodated in the inner space of the housing; and an aperture module positioned to control light incident on the lens driving module, the aperture module comprising:

a base plate configured to have a central opening and include a pivot pin protruding from, at least, one corner area of the base plate;

a pair of first blades configured to pivot about the pivot pin to form a first aperture diameter smaller than a diameter of the central opening;

a pair of second blades configured to pivot about the pivot pin to form a second aperture diameter smaller than the first aperture diameter;

a cover plate, comprising a cover guide slot, configured to cover the pair of first blades and the pair of second blades positioned on the base plate, and to be coupled to the base plate; and an aperture driver, comprising a shape memory alloy (SMA) wire and a driving pin coupled to a blade slot disposed in either one of the pair of first blades or the pair of second blades and the cover guide slot, wherein the driving pin comprises a groove disposed on an upper surface thereof, the groove receiving the SMA wire, the driving pin is configured to move along the cover guide slot, and the SMA wire is coupled to the driving pin and configured to drive the driving pin.

17. The camera module of claim 16, wherein at least a first end of the SMA wire is seated in the groove on the upper surface of the driving pin and extends laterally from the driving pin to move the driving pin depending on an electrical signal input.

18. The camera module of claim 17, wherein the driving pin includes a first driving pin coupled to a pair of first blade slots respectively disposed in the pair of first blades, and a second driving pin coupled to a pair of second blade slots respectively disposed in the pair of second blades, and the shape memory alloy wire includes a first shape memory alloy wire connected to the first driving pin, and a second shape memory alloy wire connected to the second driving pin.

19. The camera module of claim 16, wherein the pivot pin includes a first pivot pin coupled to a pair of pivot pin holes respectively disposed in the pair of first blades, and a second pivot pin coupled to a pair of pivot pin holes respectively disposed in the pair of second blades.

20. An aperture module comprising:

a base plate comprising a first pivot pin and a second pivot pin spaced apart from the first pivot pin, wherein the first pivot pin and the second pivot pin are on opposing sides of the base plate;

a pair of first blades, disposed on the first pivot pin, configured to pivot about the first pivot pin to form a first aperture diameter smaller than a diameter of a central opening of the base plate;

a pair of second blades, disposed on the second pivot pin, configured to pivot about the second pivot pin to form a second aperture diameter different than the first aperture diameter and the central opening of the base plate;

a cover plate, comprising a cover guide slot, configured to cover the pair of first blades and the pair of second blades, and to be coupled to the base plate; and an aperture driver, comprising a shape memory alloy (SMA) wire and a driving pin coupled to a blade slot disposed in either one of the pair of first blades or the pair of second blades and the cover guide slot, wherein the driving pin comprises a groove disposed on an upper surface thereof, the groove receiving the SMA wire, the driving pin is configured to move along the cover guide slot, and the SMA wire is coupled to the driving pin and configured to drive the driving pin.

21. The aperture module of claim 20, wherein a first end of the SMA wire is seated in the groove on the upper surface of the driving pin and extends laterally from the driving pin to move the driving pin depending on an electrical signal input.

22. A camera module comprising:

a lens driving module accommodated in an inner space of
   a housing; and the aperture module of claim 20 positioned within the
   housing to control light incident on the lens driving
   module.

\* \* \* \* \*